United States Patent Office 3,296,317
Patented Jan. 3, 1967

3,296,317
PROCESS FOR THE POLYMERIZATION OF UNSATURATED FATTY ALCOHOLS
Werner Stein, Dusseldorf-Holthausen, and Guntram Walther, Dusseldorf-Eller, Germany, assignors to Henkel & Cie, G.m.b.H., Dusseldorf-Holthausen, Germany
No Drawing. Filed June 1, 1962, Ser. No. 199,263
Claims priority, application Germany, June 6, 1961, H 42,782
15 Claims. (Cl. 260—635)

The instant invention is directed to a process for the polymerization of fatty alcohols and is particularly concerned with the polymerization of fatty alcohols having conjugated unsaturation.

It has already been proposed to polymerize unsaturated fatty acids by heating the acids with acid-activated aluminum silicates of the montmorillonite-type, preferably to a temperature of between 200 and 300° C., in the presence of water. When this process is carried out with unsaturated fatty alcohols there is obtained reaction products which are formed by the splitting off of water, such as, for example, hydrocarbons or ethers. As by-products there may be formed by dehydration of the unsaturated fatty alcohol the corresponding higher unsaturated hydrocarbons. If unsaturated fatty alcohols are heated together with an alkali, there then takes place a Guerbet reaction between two alcohol molecules, wherein the carbon chain of one alcohol molecule is added onto the second carbon atom of the other alcohol, water being split off so that a branched-chain alcohol having double the number of carbon atoms is formed. The Guerbet alcohol formed may also then react in the same manner with further alcohol molecules.

It is an object of this invention to provide a new and improved method for polymerizing unsaturated alcohols whereby the polymer formed retains the same number of hydroxyl groups as present in the starting alcohol molecules forming the polymer.

It is another object of the invention to provide a method whereby fatty alcohols having conjugated double bonds are polymerized to form polymers having the same number of hydroxyl groups as were present in the starting alcohol molecules forming the polymer.

Another object of the invention is to provide a continuous polymerization process whereby fatty alcohols having conjugated double bonds are polymerized to form polymers having the same number of hydroxyl groups as were present in the starting alcohol molecules forming the polymer.

Other objects will be apparent from the description and claims which follow.

These and other objects are attained by means of this invention wherein it has been found that polymers of unsaturated alcohols having the same number of hydroxyl groups as present in the starting alcohol molecules forming the polymer could be readily prepared by heating under polymerizing conditions an unsaturated alcohol having conjugated double bonds in the presence of a basically reacting alkaline earth metal compound.

The process of the invention may be carried out using as starting materials conjugated unsaturated monovalent alcohols having at least 12 and preferably 18–26 carbon atoms. Particularly suitable are alcohol mixtures having a high content of multiply unsaturated $C_{18}$ alcohols, which are derived from highly unsaturated drying or non-drying oils by reduction of the fatty acids contained therein, the reduction taking place either with the presence of nascent hydrogen or under pressure in the presence of catalysts.

The conjugated unsaturated alcohols need not be used in pure form but may be used in admixture with multiply unsaturated alcohols, the double bonds of which are not conjugated, particularly if prior to treatment in accordance with the invention or during the polymerization they are subjected to treatment to produce conjugated unsaturation. Furthermore, the reaction may also be carried out in the presence of simple unsaturated and/or saturated alcohols. The simple unsaturated alcohols, which under certain circumstances may contain fewer, i.e., down to about 3 carbon atoms in the molecule, react with the conjugated unsaturated alcohols to form polymer multivalent alcohols. As a result, the yield sometimes is higher than is to be expected on the basis of the starting material content of conjugated and unconjugated multiply unsaturated alcohols. This is particularly true for starting materials having low conjugate contents as, for example, of 3 weight percent, the treatment of which results in yields amounting to approximately three-fold, i.e. about 9 weight percent, while with conjugate contents of up to 15 weight percent and the presence of simple unsaturated alcohols, yields of up to 30 weight percent are obtainable. With conjugate contents, higher than this, the quantity of the simple unsaturated alcohols participating in the reaction becomes lower, unless there is involved particularly reactive unsaturated alcohols having their double bonds in the end position.

Accordingly, the amount of the alcohols present in the starting materials, conjugated unsaturated or convertible into this form, may amount to at least 3 weight percent, preferably at least 5 weight percent and most advantageously to more than 10 weight percent.

The reaction, where the components present in the reaction mixture boil below the reaction temperature, has to be carried out under pressure. Where it is desired to promote the condensation between the simple alcohol containing the hydroxyl group in end position and the multiply unsaturated alcohol at the expense of the polymerization between two molecules of the multiply unsaturated alcohol, then it is advisable to work at lower temperatures of at least 200 and preferably of 250–280° C., and in addition to use the simple unsaturated alcohol in excess, which, under certain circumstances, may be very large. Particularly reactive alcohols are monovalent alcohols having a double bond in the end position, such as for example allyl alcohol. In this instance of the invention, it is advisable to work in the absence of atmospheric oxygen and/or to add small quantities of antioxidants, such as for example tertiary butyl-hydroxyanisol, 4,4'-dioxy-diphenyl, etc.

As catalysts, there are suitable for use in the invention the slightly basic alkaline earth metal compounds and, in particular, the bicarbonates, carbonates, oxides, hydroxides, alcoholates and the salts of weak acids, such as for example phenolates, or compounds of magnesium, calcium, strontium and barium, etc., capable under the reaction conditions of forming such compounds. In addition, it is possible to use mixtures of these compounds. The alcoholates or phenolates, and above all magnesium alcoholates which partially dissolve in the starting alcohol, have been found to be particularly effective as catalysts. The alcoholates or phenolates may be derived from mono- or polyvalent alcohols or phenols having 1–22 and preferably 1–8 carbon atoms in their molecule.

The catalysts are used in a concentration of from about 0.01–10 weight percent, and preferably 0.1–2 weight percent, based on the weight of the starting material as applied to the polymerization, as for example in the form of a mixture of various fatty alcohols. The entirely inorganic catalysts are preferably present in quantities of 0.1–3 weight percent, the particularly active alcoholates or phenolates, i.e., those soluble in the starting material, are used preferably in amounts of 0.05–0.5 weight percent. The aforesaid catalyst concentrations are applicable for the metal oxides, the other catalyst materials to be used in equivalent quantities.

The fatty alcohol mixtures to be processed sometimes contain acid constituents and, additionally in the polymerization reaction, acid by-products may be formed. The quantity of the basic catalysts employed should always be chosen so that after the neutralization of these acid substances there will always be present a catalytically effective amount of basic catalyst.

The activity of these catalysts may be increased by adding to the polymerization mixture in addition to the catalyst, a material containing silicic acid in non-acid form, characterized by a large active surface area, such as for example kieselguhr, aerosil, silica-gel, talcum, etc. These large surface area materials are used in amounts of 0–10 percent, and preferably 0.2–2 percent.

The polymerization of the alcohols in the presence of the catalysts is carried out by heating the mixture to temperatures of at least 200, preferably of 280–380° C., and most preferably to temperatures of 300–330° C. Generally speaking, the heating may be continued over a period ranging from 5 minutes to 10 hours, and varies with the activity and quantity of the catalyst and with the temperature. As with the use of temperatures of above 340° C. an undesirable water-separation takes place, it is desirable that the heating periods where temperatures of 340° C. are involved be maintained for as short a period as possible. In addition, it is desirable to effect the polymerization in the absence of oxygen and/or in the presence of antioxidation agents.

If the multiply unsaturated alcohols present in the starting material are not present or are only present in the conjugated form, then the isomerization required to convert the alcohols to that form may be carried out either prior to the reaction in accordance with the invention, or simultaneously therewith. Catalysts which are particularly suitable when the isomerization is carried out prior to the polymerization are for example alkalis, including the alkali-alcoholates. These isomerization catalysts are advantageously removed before the polymerization is carried out as otherwise in the polymerization undesirable by-products are formed. On the other hand, metals of the platinum group and/or active carbon are suitable when the isomerization takes place simultaneously with the polymerization. These catalysts are to be used in amounts of 0.01 to 2 weight percent, referred to the starting material.

When the polymerization has been completed, the unpolymerized products are separated by distillation from the polymerized products. The residue remaining after separation of the unpolymerized fraction constitutes di- or polyvalent alcohols, which are present in the processing of the conventional technically pure starting alcohols as light-yellow, clear liquids, which do not possess any definite solidification-or turbidity-point. The dimer products obtained from conjugated $C_{18}$ fatty alcohols have a viscosity within the range of about 2,000–7,000 cp. at 25° C. and a specific gravity of about 0.90–0.93 and boil at 210–250° C./0.1 mm. The diols having 21 carbon atoms in the molecule, obtained from conjugated $C_{18}$ fatty alcohols and allyl alcohol are likewise light-yellow viscous oils, having properties which are similar to those obtained only from higher molecular fatty alcohols. The boiling points of these products lie at about 160–190° C./0.5 mm Hg.

The polymerization products obtained in accordance with the invention may be used as di- or poly-functional compounds for the production of softeners, plastics, etc., following one treatment thereof to convert the alcohols into their functional derivatives. For the conversion there may conveniently be used mono- as well as poly-functional compounds, such as for example mono- or di-carboxylic acids, mono- or di-isocyanates, etc.

The polymerizates in accordance with the invention can also be used directly. The polymerizates have drying properties and as a result are suitable for the production of coatings of drying agents.

To the extent that the distillate, which is obtained in the separation and recovery of the polymerization products, still contains multiply unsaturated unconjugated or conjugated constituents, it may be further treated in the manner in accordance with the invention. However, if the distillate does not contain any multiply unsaturated constituents, the same constituting a very pure, often water-clear fraction, may be used for other purposes and most advantageously for such purposes where a particularly low content of multiply unsaturated constituents is desirable. This constitutes a particular advantage of the invention in that the process in accordance with the invention may be used not only for the production of polymerization products of multiply unsaturated fatty alcohols, but it also serves for the removal of the multiply unsaturated fatty alcohols from technical fatty alcohol mixtures having lower than 3 weight percent contents of conjugated substances and may be applied most advantageously to technical oleyl alcohol. The distillate which results is a light-colored and very pure oleyl alcohol.

The contents of conjugated compounds indicated in the examples have been determined by UV-absorption measurement techniques. Since in such UV-absorption measurement only the conjugated group as such is determined, but not the molecule in which it is present, in the conversion of the absorption values into the contents of conjugated compounds it is necessary to proceed from the assumption that ony $C_{18}$ constituents are present in the mixture analyzed. In testing the polymerization products as regards perhaps the alcohols present, the polymerized alcohols are dissolved in a tenfold quantity of methanol and cooled to temperatures below 0° C. Under such conditions, the presence of even very slight quantities of Guerbet-alcohols becomes noticeable through the resulting turbidity. Guerbet-alcohols in quantities of 1 weight percent show in diluted methanolic solution at only 20° C. a noticeable turbidity. However, this test is not specific for Guerbet-alcohols as also other impurities, which are not diols, such as for example fatty alcohols, ethers or hydrocarbons, which under certain circumstances may be present as by-products, become noticeable through a turbidity. Most of the polymerization products produced according to the Examples 1–12 dissolved at 20° C. in a ten-fold quantity of methanol to produce a clear solution. Only the polymerization products obtained from fatty alcohols having conjugate contents of below 5 weight percent with a hydroxyl number below 200 showed even a slight turbidity.

The invention is illustrated by the following examples of certain preferred embodiments thereof, although it will be understood that the examples are illustrative only and not intended to limit the scope of the invention.

*Example 1*

200 g. of a fatty alcohol (iodine number 111; hydroxyl number 208; conjugate content=22 weight percent, prepared by the catalytic reduction of soybean-fatty-acid-methyl esters, are heated together with 0.5 g. magnesium oxide for 4 hours to 300° C. with continuous stirring of the mixture and by passing therethrough a weak flow of superheated water vapor. After the cooling, the catalyst is filtered off and the unconverted monomer alcohol separated by distillation at 150° C./0.2 mm. Hg. The colorless distillate (iodine number=90; hydroxyl number 210) consists substantially of oleyl alcohol and in addition small quantities of saturated fatty alcohols. At 200° C./0.2 mm. Hg small quantities of an intermediate fraction consisting of monomer and dimer alcohols are separated. 48 g. of a dimer diol (hydroxyl number=200, iodine number=91; molecular weight=600) remain as residue.

Example 2

(a) 200 g. of a fatty alcohol (hydroxyl number=210; iodine number 154; conjugate content about 0.5—1 weight percent) prepared by reduction of a soybean-oil-fatty-acid-methylester with lithium aluminum hydride in absolute ether, are heated together with 1 g. magnesium oxide and 0.5 g. kieselguhr to 300° C. for 6 hours in a water vapor atmosphere. The reaction product is worked up as described in Example 1, and there is recovered by distillation 171 g. of a monomer fatty alcohol (hydroxyl number=211; iodine number=145). The residue amounts to 28.5 g. and has a hydroxyl number=190, iodine number=99.

(b) 220 g. of the starting material as set forth under (a) are heated for 5 hours with 200 g. potassium hydroxide in 1 liter absolute butanol to the boiling point (120° C.). After separating off the alkali and the solvent and distilling off the alcohol under vacuum, a distillate having the following properties is obtained: hydroxyl number=209, iodine number=135, conjugate content=58 weight percent. 200 g. of this product are, as described under (a), polymerized for 3 hours at 300° C. and then worked up. After 100 g. of a monomer fraction (iodine number=107) have been distilled off, there remain as residue 90 g. of a light yellow colored diol (hydroxyl number=202, iodine number=93.4, molecular weight =590).

(c) The monomer fraction separated by distillation in (b) is, after addition thereto of 0.6 g. magnesium oxide and 0.3 g. kieselguhr, dimerized in the manner set forth in (b). There is obtained, in addition to a water-clear oleyl-alcohol, 23.5 g. diol (hydroxyl number=206, iodine number=88). As a result, the yield which is obtained by combining (b) and (c) amounts to 113.5 g. of diol.

Example 3

200 g. of a fatty alcohol prepared by the catalytic hydration of a fatty acid of linseed oil methyl esters (iodine number=145; hydroxyl number=214; conjugate content=8.5 weight percent) are heated, following addition thereto of 1.5 g. calcium carbonate and 2 g. kieselguhr to 210° C. for 3 hours in a nitrogen atmosphere under stirring. After the monomer fraction (iodine number=107) has been distilled off, there are obtained as residue 43 g. of dimer alcohol (hydroxyl number=208; iodine number=120). The monomer fraction recovered in the distillation of the reaction product still contains multiple unsaturated constituents and can be, as in Example 2(b), subjected to further polymerization.

Example 4

200 g. of the same fatty alcohol as used in Example 3 are heated to 330° C. under introduction of superheated water vapor for 1.5 hours, after addition thereto of 1 g. magnesium carbonate and 2 g. kieselguhr. After distilling off the monomer fatty alcohol fraction there remain 52 g. dimer diol (hydroxyl number=205; iodine number=113).

Example 5

200 g. of a fatty alcohol prepared from linseed oil (iodine number=126; hydroxyl number=212; conjugate content=15 weight percent) are heated for 6 hours under a nitrogen atmosphere and with stirring to 300° C., after adding thereto 0.5 g. barium carbonate and 2 g. silica gel. After the monomer fraction is distilled off, there remain 62 g. dimer diol (hydroxyl number=205; iodine number=111).

Example 6

(a) 200 g. of a fatty alcohol, prepared from a mixture of equal parts by weight of cotton-seed and cotton-seed-oil-fatty acid (iodine number=115; hydroxyl number=210; conjugate content=4.2 weight percent), following addition thereto of 1 g. magnesium oxide and 2 g. kieselguhr, are heated for 6 hours under a nitrogen atmosphere and with stirring to 300° C. After distilling off the monomer fraction, there remain 24 g. of a dimer alcohol (hydroxyl number=198; iodine number=110).

(b) The process which is described under (a) is repeated, but in addition there are added to the mixture 0.04 g. palladium-black. There are obtained 48 g. diol (hydroxyl number=206, iodine number=106).

Example 7

200 g. of a fatty alcohol, prepared by the catalytic reduction of soybean-oil (hydroxyl number=208; iodine number=128; conjugate content=41 weight percent), to which there have been added 0.1 g. magnesium methylate and 1 g. of sharply dried kieselguhr, are heated for 2.5 hours in a nitrogen atmosphere under stirring to 325° C. After the catalyst has been filtered off and the monomer fraction separated by distillation, the residue is heated with 2 g. acid-activated bleaching earth and filtered. There is obtained 88 g. dimer diol (hydroxyl number=208; iodine number=78).

Example 8

200 g. of a fatty alcohol derived from soybean-oil (hydroxyl number=210; iodine number=110; conjugate content=32.5 weight percent), after addition thereto of 100 g. allyl alcohol, 3 g. magnesium oxide and 0.5 g. tertiary butylhydroxy anisol, are heated in an autoclave under nitrogen atmosphere for 3 hours to 280° C. After the mixture has been cooled and the pressure in the autoclave reduced, the reaction product is filtered and the unconverted allyl alcohol is distilled off at 90–105° C. About 70 weight percent of the allyl alcohol charged is thereby recovered. Thereafter, the monomer fatty alcohol (hydroxyl number=212; iodine number=94) are distilled off at 100–150° C./0.1 mm. Hg, followed by distilling over of a small intermediate fraction. There are then distilled off at 160–185° C./0.1 mm. Hg, 50 g. of the condensation product of a multiply unsaturated fatty alcohol and allyl alcohol (hydroxyl number=340; iodine number=84.5; carbonyl number=1.5; molecular weight= 320). There remain 9 g. of a residue (hydroxyl number=334, iodine number=66.7).

Example 9

200 g. of a fatty alcohol which have been obtained from soybean-oil (hydroxyl number=214; iodine number=113; conjugate content=31 weight percent, after addition thereto of 0.5 g. magnesium-oxide and 1 g. kieselguhr, are heated for 30 minutes under a nitrogen atmosphere to 345° C. In the working-up carried out in conventional manner, there are obtained 78 g. diol (hydroxyl number=205; iodine number 86).

Example 10

The polymerization is carried out continuously using an apparatus comprising a tube having clear width of 1.5 cm. and a length of 1 m. and which is provided with a heating jacket. The fatty alcohol with the catalyst dissolved therein is introduced from below into this tube heated to 350° C. The dimerization product emerges from the upper end of the tube, is cooled and collected, and worked up in discontinuous manner. Prior to being worked up, the reaction product is treated with an acid-activated bleaching earth and filtered as a result of which the slight amounts of catalyst are retained in the bleaching earth. Thereafter the monomer alcohol fraction is distilled off, as previously described.

The starting material is an alcohol (hydroxyl number=214; iodine number=113; conjugate content=30 weight percent) prepared from soybean-oil fatty acid, by treatment thereof with 0.1 weight percent magnesium methylate. At a reaction temperature of 335° C. and a median time of stay of the fatty alcohol in the reaction zone of 80 minutes, the diol (hydroxyl number=208; iodine number=83; molecular weight=580) is recovered in a yield of 27 weight percent, referred to as the fat-alcohol charged.

*Example 11*

The starting material is a fatty alcohol obtained from tallow-oil fatty-acid (hydroxyl number=214; iodine number=113; conjugate content=31 weight percent). 200 g. of this fatty alcohol are heated, after addition thereto of 0.2 g. magnesium-phenolate and 2 g. kieselguhr for 3 hours under stirring and passing therethrough of superheated water vapor to 320° C. The water vapor recovered after passing through the mixture is condensed and the condensate is separated in a water separator into water and a fatty alcohol fraction, which latter is returned into the reaction vessel. The crude reaction product is worked-up as described in the previous examples, and 66 g. diol (hydroxyl number=204; iodine number=87) are recovered. The recovered monomer fatty alcohol and the dimerization product do not contain any phenol.

*Example 12*

A fatty alcohol which has been obtained from the components of a cotton-seed-oil-fatty acid, still liquid at +5° C. and subjected to catalytic hydrogenation and distillation, is used as starting material. In order to obtain an oleyl alcohol, as free as possible from multiply unsaturated constituents 200 g. of this starting material are heated following addition thereto of 0.5 g. magnesium-oxide for 3 hours to 320° C., and thereafter subjected to distillation at a pressure of 0.1 mm. Hg. After the separation of a first fraction of about 5 g., the main fraction passes over at 110–130° C. in an amount of 168 g. The properties of the starting material (shown in brackets) and of the purified oleyl-alcohol are as follows: conjugate content=(9)<1 weight percent; hydroxyl number=(218) 212; turbidity point=(+6)+8.5° C. Color number, measured in the Lovibond-tintometer (10 cm. vessel); yellow=(1.8) 0.3, red=(0.4) 0.0. The content of trans-compounds is the same in the starting material and in the purified fatty alcohol.

The distillation residue is filtered following addition thereto of 1 g. acid-activated bleaching earth. There are recovered 24.5 g. of a diol having a hydroxyl number of 203 and an iodine number of 84.

The chemical composition and the properties of the polymeric fatty alcohols obtained in accordance with the invention are dependent on the nature of the starting materials. Thus, for example, there is an increase in the content of trimers in the polymer, with an increase in the iodine number of the starting materials, and therewith also its density refractive index and viscosity.

The polyvalent alchols which are produced in accordance with the process of the invention differ in various respects from those products which are obtained by reduction of dimerized fatty acid esters. While the alcohols which are produced according to the latter process, in general, still contain esters, which may be recognized from the saponification number of about 20–30, the products obtained in accordance with the invention have substantially no saponification number. Additionally, the products produced by the reduction of fatty acid esters are more markedly saturated than are those obtained in accordance with the invention. The difference in the degree of saturation is particularly easily recognized by the hydrogenation iodine number, as the analytical methods are carried out under addition of halogens to the double bonds, giving rise through the substitutions to a greater iodine number. In general, the hydrogenation iodine number amounts to ⅔ of the iodine number produced by the halogen addition.

The following table shows some of the characteristic properties of the products which are obtained according to the process of the invention. The iodine number observed following halogenation is compared with the hydrogenation iodine number.

| Examples | Percent Trimer | Density | Viscosity | $n_D/25$ | Iodine Number | Hydrogenation Iodine Number |
|---|---|---|---|---|---|---|
| 3, 4, 5 | 30 | 0.930 | 6,500 | 1.496 | 111–120 | 70–80 |
| 1, 2, 7, 9, 10, 11 | 16 | 0.910 | 4,500 | 1.491 | 80–95 | 50–60 |
| 12 | 10 | 0.910 | 2,800 | 1.488 | 78–84 | 35–45 |
| 8 | | 0.900 | 2,800 | 1.499 | 85 | |

If in carrying out the process in accordance with the invention fatty alcohols having an iodine number of at least 105, and preferably of at least 115, are used as starting materials, then the products recovered have drying properties. If there is added to the polymers produced according to Examples 3, 4, and 5, 0.2 weight percent of a drying agent, as, for example, cobalt-naphthenate or cobalt-lead-manganese-naphthenate, and the resulting mixture applied by brushing onto glass sheets, there are obtained at room temperature within 3 days, at 100° C. within 2 hours, and at 150° C. after about 30 minutes, transparent, elastic films of good adhesiveness.

The dimeric alcohols prepared according to the invention and having substantially no saponification value are new products and are characterized by the following data:

Average number of carbon atoms per molecule _____ 20–48
Hydroxyl number _____ 160–400
Iodine number _____ 60–140
Hydrogenation iodine number _____ 20–100
Saponification number _____ <2
Content of monovalent polymeric alcohols, percent by weight _____ <5

In the case of dimerizates from $C_{18}$-alcohols the following data may be given:

Average number of carbon atoms per molecule _____ 36–48
Hydroxyl number _____ 190–210
Iodine number _____ 60–140
Hydrogenation iodine number _____ 20–100
Saponification number _____ <1
Content of monovalent polymeric alcohols, percent by weight _____ <5

In the case of dimerizates from $C_{18}$-alcohols and allyl alcohol the following data may be given:

Average number of carbon atoms per molecule _____ 20–23
Hydroxyl number _____ 310–400
Iodine number _____ 60–90
Saponification number _____ <2

During the determination of the hydrogenation iodine number, the consumption of the hydrogen may become more and more slow. Therefore, the tests were run for such a long time, that the consumption of the hydrogen had nearly come to an end. In most cases, 40 hours were necessary to reach a complete hydrogenation.

We claim:

1. A process for the polymerization of unsaturated fatty alcohols to form polymers having the same number of hydroxyl groups as present in the starting alcohol molecules forming the polymer, which comprises contacting an unsubstituted unsaturated fatty alcohol containing 12 to 26 carbon atoms and having conjugated double bonds at a temperature in the range 200–380° C. in the presence of about 0.01–10 weight percent referred to the unsaturated alcohol of at least one basically reacting alkaline earth metal compound selected from the group consisting of alkaline earth metal, bicarbonates, carbonates, oxides and hydroxides, and unsubstituted phenolates and alcoholates having 1 to 22 carbon atoms in their molecules for a period ranging from about 5 minutes to about 10 hours and recovering the polymer thus produced.

2. Process according to claim 1, wherein said unsaturated alcohol having conjugated double bonds contains at least 12 carbon atoms.

3. Process according to claim 1, wherein said unsaturated alcohol having conjugated double bonds contains from 18 to 26 carbon atoms.

4. Process according to claim 1, wherein said unsaturated alcohol having conjugated double bonds is present in a mixture of alcohols in an amount of at least 3 weight percent.

5. Process according to claim 1, wherein said unsaturated alcohol having conjugated double bonds is present in a mixture of alcohols in an amount of at least 10 weight percent.

6. Process according to claim 1, wherein said unsaturated alcohol having conjugated double bonds is present in a mixture of alcohols containing conjugated unsaturation and alcohols convertible to the same.

7. Process according to claim 1, which comprises effecting said contacting in the absence of oxygen.

8. Process according to claim 1, which comprises effecting said contacting in the presence of an anti-oxidizing agent selected from the group consisting of tertiary-butyl-hydroxy anisol and 4,4'-dioxy-diphenyl.

9. Process according to claim 1, which comprises effecting said contacting in the presence of about 0.1 to 2 weight percent referred to the unsaturated alcohol of said basically reacting alkaline earth metal compound.

10. Process according to claim 1, which comprises effecting said contacting in the additional presence of 0.2–10 percent of a material containing silicic acid in non-acid form and characterized by a large surface area.

11. Process according to claim 6 which comprises the additional step of converting the alcohols containing unconjugated unsaturation by contacting the alcohol mixture with 0.01 to 2 weight percent of a member selected from the group consisting of alkali metal alcoholates, metals of the platinum group and active carbon, whereby said alcohols containing unconjugated unsaturation are isomerized.

12. Process according to claim 1, which comprises carrying out said contacting to isomerize the alcohols containing unconjugated unsaturation prior to said contacting for producing the polymer.

13. Process according to claim 11, which comprises carrying out said contacting to isomerize the alcohol containing unconjugated unsaturation simultaneously with said contacting for producing the polymer.

14. A polymer of unsaturated fatty alcohols having the same number of hydroxyl groups as present in the starting alcohol molecules forming the polymer prepared by contacting an unsubstituted unsaturated fatty alcohol containing 12 to 26 carbon atoms and having conjugated double bonds at a temperature in the range 200°–380° C. with about 0.01–10 weight percent referred to the unsaturated alcohol of at least one basically reacting alkaline earth metal compound selected from the group consisting of alkaline earth metal, bicarbonates, carbonates, oxides and hydroxides, and unsubstituted phenolates and alcoholates having 1 to 22 carbon atoms in their molecules for a period ranging from about 5 minutes to about 10 hours.

15. A process for the removal of unsubstituted unsaturated fatty alcohols containing 12 to 26 carbon atoms and containing multiple unsaturation in admixture with unsubstituted fatty alcohols free of multiple unsaturation and containing 12 to 26 carbon atoms which comprises contacting with 0.01 to 2 weight percent of a member selected from the group consisting of alkali metal alcoholates, metals of the platinum group and active carbon whereby the alcohols containing unconjugated unsaturation are isomerized to produce alcohols containing conjugated saturation, thereafter contacting the resultant alcohol mixture having conjugated unsaturation at a temperature in the range 200–380° C. with about 0.01–10 weight percent referred to the unsaturated alcohol of at least one basically reacting alkaline earth metal compound selected from the group consisting of alkaline earth metal, bicarbonates, carbonates, oxides and hydroxides, and unsubstituted phenolates and alcoholates having 1 to 22 carbon atoms in their molecules for a period ranging from about 5 minutes to about 10 hours and separating the alcohol fraction free of multiple unsaturation from the resulting mixture by distillation.

References Cited by the Examiner

UNITED STATES PATENTS

| | | | |
|---|---|---|---|
| 2,202,849 | 6/1940 | Grant | 260—407 |
| 2,219,862 | 10/1940 | Bradley et al. | 260—407 |
| 2,341,239 | 2/1944 | Percy et al. | 260—407 |
| 2,401,776 | 6/1946 | Rothrock | 260—407 |
| 2,482,760 | 9/1949 | Goebel | 260—407 |
| 2,593,009 | 4/1952 | Clark et al. | 260—642 |
| 2,645,668 | 7/1953 | Burgoyne et al. | 260—642 |
| 2,800,516 | 9/1957 | Wilson | 260—635 |
| 2,819,317 | 1/1958 | Ayres | 260—642 |
| 2,955,121 | 10/1960 | Myers et al. | 260—407 |

LEON ZITVER, *Primary Examiner.*

DANIEL E. WYMAN, *Examiner.*

M. B. ROBERTO, J. E. EVANS, *Assistant Examiners.*